United States Patent
Greer, Jr. et al.

(10) Patent No.: US 9,187,236 B2
(45) Date of Patent: *Nov. 17, 2015

(54) AEROSOL SYSTEM FOR REPAIRING A PATCHED PORTION OF A SURFACE

(75) Inventors: Lester R. Greer, Jr., Sandpoint, ID (US); John Kordosh, Simi Valley, CA (US); Ross Clawson, Bellingham, WA (US)

(73) Assignee: Homax Products, Inc., Bellingham, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/207,384

(22) Filed: Aug. 10, 2011

(65) Prior Publication Data

US 2012/0064249 A1    Mar. 15, 2012

Related U.S. Application Data

(63) Continuation of application No. 12/277,229, filed on Nov. 24, 2008, now abandoned, which is a continuation of application No. 11/045,412, filed on Jan. 27, 2005, now abandoned.

(60) Provisional application No. 60/539,681, filed on Jan. 28, 2004.

(51) Int. Cl.
*B05B 17/00* (2006.01)
*B65D 83/68* (2006.01)
(Continued)

(52) U.S. Cl.
CPC . *B65D 83/68* (2013.01); *B05B 1/12* (2013.01); *B05B 1/14* (2013.01); *B05B 1/16* (2013.01);
(Continued)

(58) Field of Classification Search
CPC .......... B05B 1/34; B05B 7/2435; B05B 9/04; B05B 15/065; B05B 1/1654; B05B 1/16; B05B 1/14; B05B 1/1645; B65D 83/20; B65D 83/44; B65D 83/7532; B65D 83/38; B65D 83/48; B65D 83/752; B65D 83/68; C08K 5/17; C08K 5/18; C08K 5/1345; C08K 5/134; A61Q 17/04; B05D 5/061; B05D 5/00; B05D 1/02
USPC ......... 239/337, 346, 373, 390, 391, 392, 394, 239/397; 222/402.1, 402.17, 394; 524/249, 524/291; 424/59

See application file for complete search history.

(56) References Cited

U.S. PATENT DOCUMENTS 208,330 A    9/1878   Palmer
351,968 A   11/1886   Derrick
(Continued)

FOREIGN PATENT DOCUMENTS

CA    770467    10/1967
CA    976125    10/1975
(Continued)

OTHER PUBLICATIONS

Homax Products, Inc., "Easy Touch Spray Texture Brochure", Mar. 1992, 1 page.
(Continued)

*Primary Examiner* — Steven J Ganey
(74) *Attorney, Agent, or Firm* — Michael R. Schacht

(57) ABSTRACT

A texturing system for applying a desired texture pattern on a patched portion of a surface. The texturing system comprises texture material, a dispensing system for dispensing the texture material, and a selecting system. The texture material comprises a carrier, a binder, a filler, and a change material. The texture material changes from a wet form to a solidified form when exposed to air. The change material changes appearance when the texture material changes from the wet form to the solidified form. The selecting system is supported by the dispensing system such that texture material dispensed from the dispensing system is dispensed through an outlet opening in the desired texture pattern. The dispensing system is used to deposit the texture material onto the patched portion of the surface in the desired texture pattern.

7 Claims, 1 Drawing Sheet

(51) Int. Cl.
| | | |
|---|---|---|
| *B05B 1/34* | (2006.01) | |
| *B05B 7/24* | (2006.01) | |
| *B05B 9/04* | (2006.01) | |
| *B05B 15/06* | (2006.01) | |
| *B05B 1/16* | (2006.01) | |
| *B05B 1/12* | (2006.01) | |
| *B05B 1/14* | (2006.01) | |
| *B65D 83/44* | (2006.01) | |
| *B65D 83/20* | (2006.01) | |
| *B65D 83/14* | (2006.01) | |
| *B65D 83/38* | (2006.01) | |
| *B65D 83/48* | (2006.01) | |
| *B05D 5/06* | (2006.01) | |
| *B05D 5/00* | (2006.01) | |
| *B05D 1/02* | (2006.01) | |

(52) U.S. Cl.
CPC ............ *B05B 1/1645* (2013.01); *B05B 1/1654* (2013.01); *B05B 1/34* (2013.01); *B05B 7/2435* (2013.01); *B05B 9/04* (2013.01); *B05B 15/065* (2013.01); *B05D 5/00* (2013.01); *B05D 5/061* (2013.01); *B65D 83/20* (2013.01); *B65D 83/38* (2013.01); *B65D 83/44* (2013.01); *B65D 83/48* (2013.01); *B65D 83/752* (2013.01); *B65D 83/7532* (2013.01); *B05D 1/02* (2013.01)

(56) References Cited

U.S. PATENT DOCUMENTS

| | | |
|---|---|---|
| D25,916 S | 8/1896 | Woods |
| 568,876 A | 10/1896 | Regan |
| 579,418 A | 3/1897 | Bookwalter |
| 582,397 A | 5/1897 | Shone |
| 658,586 A | 9/1900 | Reiling |
| 930,095 A | 8/1909 | Seagrave |
| 931,757 A | 8/1909 | Harmer |
| 941,671 A | 11/1909 | Campbell |
| 1,093,907 A | 4/1914 | Birnbaum |
| 1,154,974 A | 9/1915 | Custer |
| 1,486,156 A | 3/1924 | Needham |
| 2,127,188 A | 8/1938 | Schellin et al. |
| 2,149,930 A | 3/1939 | Plastaras |
| D134,562 S | 12/1942 | Murphy |
| 2,307,014 A | 1/1943 | Becker et al. |
| 2,320,964 A | 6/1943 | Yates |
| 2,353,318 A | 7/1944 | Scheller |
| 2,388,093 A | 10/1945 | Smith |
| 2,530,808 A | 11/1950 | Cerasi |
| 2,565,954 A | 8/1951 | Dey |
| 2,612,293 A | 9/1952 | Michel |
| 2,686,652 A | 8/1954 | Carlson et al. |
| 2,723,200 A | 11/1955 | Pyenson |
| 2,763,406 A | 9/1956 | Countryman |
| 2,764,454 A | 9/1956 | Edelstein |
| 2,785,926 A | 3/1957 | Lataste |
| 2,790,680 A | 4/1957 | Rosholt |
| 2,831,618 A | 4/1958 | Soffer et al. |
| 2,839,225 A | 6/1958 | Soffer et al. |
| 2,908,446 A | 10/1959 | Strouse |
| 2,932,434 A | 4/1960 | Abplanalp |
| 2,965,270 A | 12/1960 | Soffer et al. |
| 2,968,441 A | 1/1961 | Holcomb |
| 2,976,897 A | 3/1961 | Beckworth |
| 2,997,243 A | 8/1961 | Kolb |
| 3,083,872 A | 4/1963 | Meshberg |
| 3,107,059 A | 10/1963 | Frechette |
| 3,167,525 A | 1/1965 | Thomas |
| 3,191,809 A | 6/1965 | Schultz et al. |
| 3,196,819 A | 7/1965 | Lechner et al. |
| 3,198,394 A | 8/1965 | Lefer |
| 3,216,628 A | 11/1965 | Fergusson |
| 3,246,850 A | 4/1966 | Bourke |
| 3,258,208 A | 6/1966 | Greenebaum, II |
| 3,284,007 A | 11/1966 | Clapp |
| 3,314,571 A | 4/1967 | Greenebaum, II |
| 3,317,140 A | 5/1967 | Smith |
| 3,342,382 A | 9/1967 | Huling |
| 3,346,195 A | 10/1967 | Groth |
| 3,373,908 A | 3/1968 | Crowell |
| 3,377,028 A | 4/1968 | Bruggeman |
| 3,390,121 A | 6/1968 | Burford et al. |
| 3,414,171 A | 12/1968 | Grisham et al. |
| 3,415,425 A | 12/1968 | Knight et al. |
| 3,425,600 A | 2/1969 | Abplanalp |
| 3,428,224 A | 2/1969 | Eberhardt et al. |
| 3,433,391 A | 3/1969 | Krizka et al. |
| 3,450,314 A | 6/1969 | Gross |
| 3,467,283 A | 9/1969 | Kinnavy |
| 3,472,457 A | 10/1969 | McAvoy |
| 3,482,738 A | 12/1969 | Bartels |
| 3,513,886 A | 5/1970 | Easter et al. |
| 3,514,042 A | 5/1970 | Freed |
| 3,544,258 A | 12/1970 | Presant et al. |
| 3,548,564 A | 12/1970 | Bruce et al. |
| 3,550,861 A | 12/1970 | Teson |
| 3,575,319 A | 4/1971 | Safianoff |
| 3,592,359 A | 7/1971 | Marraffino |
| 3,596,835 A | 8/1971 | Smith et al. |
| 3,608,822 A | 9/1971 | Berthoud |
| 3,613,954 A | 10/1971 | Bayne |
| 3,648,932 A | 3/1972 | Ewald et al. |
| 3,653,558 A | 4/1972 | Shay |
| 3,698,645 A | 10/1972 | Coffey |
| 3,700,136 A | 10/1972 | Ruekberg |
| 3,703,994 A | 11/1972 | Nigro |
| 3,704,811 A | 12/1972 | Harden, Jr. |
| 3,704,831 A | 12/1972 | Clark |
| 3,705,669 A | 12/1972 | Cox et al. |
| 3,711,030 A | 1/1973 | Jones |
| 3,764,067 A | 10/1973 | Coffey et al. |
| 3,770,166 A | 11/1973 | Marand |
| 3,773,706 A | 11/1973 | Dunn, Jr. |
| 3,776,470 A | 12/1973 | Tsuchiya |
| 3,776,702 A | 12/1973 | Chant |
| 3,777,981 A | 12/1973 | Probst et al. |
| 3,788,521 A | 1/1974 | Laauwe |
| 3,795,366 A | 3/1974 | McGhie et al. |
| 3,799,398 A | 3/1974 | Morane et al. |
| 3,806,005 A | 4/1974 | Prussin et al. |
| 3,811,369 A | 5/1974 | Ruegg |
| 3,813,011 A | 5/1974 | Harrison et al. |
| 3,814,326 A | 6/1974 | Bartlett |
| 3,819,119 A | 6/1974 | Coffey et al. |
| 3,828,977 A | 8/1974 | Borchert |
| 3,848,778 A | 11/1974 | Meshberg |
| 3,862,705 A | 1/1975 | Beres et al. |
| 3,871,553 A | 3/1975 | Steinberg |
| 3,891,128 A | 6/1975 | Smrt |
| 2,913,842 A | 10/1975 | Singer |
| 3,912,132 A | 10/1975 | Stevens |
| 3,913,803 A | 10/1975 | Laauwe |
| 3,913,804 A | 10/1975 | Laauwe |
| 3,932,973 A | 1/1976 | Moore |
| 3,936,002 A | 2/1976 | Geberth, Jr. |
| 3,938,708 A | 2/1976 | Burger |
| 3,975,554 A | 8/1976 | Kummins et al. |
| 3,982,698 A | 9/1976 | Anderson |
| 3,989,165 A | 11/1976 | Shaw et al. |
| 3,991,916 A | 11/1976 | Del Bon |
| 3,992,003 A | 11/1976 | Visceglia et al. |
| 4,010,134 A | 3/1977 | Braunisch et al. |
| 4,032,064 A | 6/1977 | Giggard |
| 4,036,673 A | 7/1977 | Murphy et al. |
| 4,045,860 A | 9/1977 | Winckler |
| 4,089,443 A | 5/1978 | Zrinyi |
| 4,096,974 A | 6/1978 | Haber et al. |
| 4,117,951 A | 10/1978 | Winckler |
| 4,129,448 A | 12/1978 | Greenfield et al. |
| 4,147,284 A | 4/1979 | Mizzi |
| 4,148,416 A | 4/1979 | Gunn-Smith |
| 4,154,378 A | 5/1979 | Paoletti et al. |

(56) References Cited

U.S. PATENT DOCUMENTS

| | | | |
|---|---|---|---|
| 4,164,492 A | 8/1979 | Cooper | |
| RE30,093 E | 9/1979 | Burger | |
| 4,171,757 A | 10/1979 | Diamond | |
| 4,173,558 A | 11/1979 | Beck | |
| 4,185,758 A | 1/1980 | Giggard | |
| 4,187,959 A | 2/1980 | Pelton | |
| 4,187,985 A | 2/1980 | Goth | |
| 4,198,365 A | 4/1980 | Pelton | |
| 4,202,470 A | 5/1980 | Fujii | |
| 4,238,264 A | 12/1980 | Pelton | |
| 4,240,940 A | 12/1980 | Vasishth et al. | |
| 4,258,141 A | 3/1981 | Jarre et al. | |
| 4,275,172 A | 6/1981 | Barth et al. | |
| 4,293,353 A | 10/1981 | Pelton et al. | |
| 4,308,973 A | 1/1982 | Irland | |
| 4,310,108 A | 1/1982 | Motoyama et al. | |
| 4,322,020 A | 3/1982 | Stone | |
| 4,346,743 A | 8/1982 | Miller | |
| 4,354,638 A | 10/1982 | Weinstein | |
| 4,358,388 A | 11/1982 | Daniel et al. | |
| 4,370,930 A | 2/1983 | Strasser et al. | |
| 4,372,475 A | 2/1983 | Goforth et al. | |
| 4,401,271 A | 8/1983 | Hansen | |
| 4,401,272 A | 8/1983 | Merton et al. | |
| 4,411,387 A | 10/1983 | Stern et al. | |
| 4,417,674 A | 11/1983 | Giuffredi | |
| 4,438,221 A | 3/1984 | Fracalossi et al. | |
| 4,442,959 A | 4/1984 | Del Bon et al. | |
| 4,460,719 A | 7/1984 | Danville | |
| 4,482,662 A | 11/1984 | Rapaport et al. | |
| 4,496,081 A | 1/1985 | Farrey | |
| 4,546,905 A | 10/1985 | Nandagiri et al. | |
| 4,595,127 A | 6/1986 | Stoody | |
| 4,609,608 A | 9/1986 | Solc | |
| 4,641,765 A | 2/1987 | Diamond | |
| 4,683,246 A | 7/1987 | Davis et al. | |
| 4,702,400 A | 10/1987 | Corbett | |
| 4,728,007 A | 3/1988 | Samuelson et al. | |
| 4,744,495 A | 5/1988 | Warby | |
| 4,761,312 A | 8/1988 | Koshi et al. | |
| 4,792,062 A | 12/1988 | Goncalves | |
| 4,793,162 A | 12/1988 | Emmons | |
| 4,804,144 A | 2/1989 | Denman | |
| 4,815,414 A | 3/1989 | Duffy et al. | |
| 4,819,838 A | 4/1989 | Hart, Jr. | |
| 4,830,224 A | 5/1989 | Brison | |
| 4,839,393 A | 6/1989 | Buchanan et al. | |
| 4,854,482 A | 8/1989 | Bergner | |
| 4,870,805 A | 10/1989 | Morane | |
| 4,878,599 A | 11/1989 | Greenway | |
| 4,887,651 A | 12/1989 | Santiago | |
| 4,893,730 A | 1/1990 | Bolduc | |
| 4,896,832 A | 1/1990 | Howlett | |
| D307,649 S | 5/1990 | Henry | |
| 4,940,171 A | 7/1990 | Gilroy | |
| 4,949,871 A | 8/1990 | Flanner | |
| 4,953,759 A | 9/1990 | Schmidt | |
| 4,954,544 A | 9/1990 | Chandaria | |
| 4,955,545 A | 9/1990 | Stern et al. | |
| 4,961,537 A | 10/1990 | Stern | |
| 4,969,577 A | 11/1990 | Werding | |
| 4,969,579 A | 11/1990 | Behar | |
| 4,988,017 A | 1/1991 | Schrader et al. | |
| 4,991,750 A | 2/1991 | Moral | |
| 5,007,556 A | 4/1991 | Lover | |
| 5,009,390 A | 4/1991 | McAuliffe, Jr. et al. | |
| 5,037,011 A * | 8/1991 | Woods | 239/346 |
| 5,038,964 A | 8/1991 | Bouix | |
| 5,052,585 A | 10/1991 | Bolduc | |
| 5,059,187 A | 10/1991 | Sperry et al. | |
| 5,065,900 A | 11/1991 | Scheindel | |
| 5,069,390 A | 12/1991 | Stern et al. | |
| 5,083,685 A | 1/1992 | Amemiya et al. | |
| 5,100,055 A | 3/1992 | Rokitenetz et al. | |
| 5,115,944 A | 5/1992 | Nikolich | |
| 5,126,086 A | 6/1992 | Stoffel | |
| 5,169,037 A | 12/1992 | Davies et al. | |
| 5,182,316 A | 1/1993 | DeVoe et al. | |
| 5,188,263 A * | 2/1993 | Woods | 222/394 |
| 5,188,295 A | 2/1993 | Stern et al. | |
| 5,211,317 A | 5/1993 | Diamond et al. | |
| 5,219,609 A | 6/1993 | Owens | |
| 5,250,599 A | 10/1993 | Swartz | |
| 5,277,336 A | 1/1994 | Youel | |
| 5,297,704 A | 3/1994 | Stollmeyer | |
| 5,307,964 A | 5/1994 | Toth | |
| 5,310,095 A * | 5/1994 | Stern et al. | 222/402.1 |
| 5,312,888 A | 5/1994 | Nafziger et al. | |
| 5,314,097 A | 5/1994 | Smrt et al. | |
| 5,323,963 A | 6/1994 | Ballu | |
| 5,341,970 A | 8/1994 | Woods | |
| 5,342,597 A | 8/1994 | Tunison, III | |
| 5,368,207 A | 11/1994 | Cruysberghs | |
| 5,374,434 A | 12/1994 | Clapp et al. | |
| 5,405,051 A | 4/1995 | Miskell | |
| 5,409,148 A | 4/1995 | Stern et al. | |
| 5,417,357 A | 5/1995 | Yquel | |
| D358,989 S | 6/1995 | Woods | |
| 5,421,519 A | 6/1995 | Woods | |
| 5,425,824 A | 6/1995 | Marwick | |
| 5,450,983 A | 9/1995 | Stern et al. | |
| 5,467,902 A | 11/1995 | Yquel | |
| 5,476,879 A * | 12/1995 | Woods et al. | 222/394 |
| 5,489,048 A | 2/1996 | Stern et al. | |
| 5,498,282 A | 3/1996 | Miller et al. | |
| 5,501,375 A | 3/1996 | Nilson | |
| 5,505,344 A | 4/1996 | Woods | |
| 5,523,798 A | 6/1996 | Hagino et al. | |
| 5,524,798 A * | 6/1996 | Stern et al. | 239/394 |
| 5,544,783 A | 8/1996 | Conigliaro | |
| 5,548,010 A | 8/1996 | Franer | |
| 5,549,228 A | 8/1996 | Brown | |
| 5,558,247 A | 9/1996 | Caso | |
| 5,562,235 A | 10/1996 | Cruysberghs | |
| 5,570,813 A | 11/1996 | Clark, II | |
| 5,573,137 A | 11/1996 | Pauls | |
| 5,583,178 A | 12/1996 | Oxman et al. | |
| 5,597,095 A | 1/1997 | Ferrara, Jr. | |
| 5,615,804 A | 4/1997 | Brown | |
| 5,639,026 A | 6/1997 | Woods | |
| 5,641,095 A | 6/1997 | de Laforcade | |
| 5,645,198 A | 7/1997 | Stern et al. | |
| 5,655,691 A | 8/1997 | Stern et al. | |
| 5,715,975 A | 2/1998 | Stern et al. | |
| 5,727,736 A | 3/1998 | Tryon | |
| 5,752,631 A | 5/1998 | Yabuno et al. | |
| 5,775,432 A | 7/1998 | Burns et al. | |
| 5,792,465 A | 8/1998 | Hagarty | |
| 5,799,879 A | 9/1998 | Ottl et al. | |
| 5,865,351 A | 2/1999 | De Laforcade | |
| 5,868,286 A | 2/1999 | Mascitelli | |
| 5,887,756 A | 3/1999 | Brown | |
| 5,894,964 A | 4/1999 | Barnes et al. | |
| 5,915,598 A | 6/1999 | Yazawa et al. | |
| 5,921,446 A | 7/1999 | Stern | |
| 5,934,518 A | 8/1999 | Stern et al. | |
| 5,941,462 A | 8/1999 | Sandor | |
| 5,957,333 A | 9/1999 | Losenno et al. | |
| 5,975,356 A | 11/1999 | Yquel et al. | |
| 5,988,575 A | 11/1999 | Lesko | |
| 5,997,891 A * | 12/1999 | Fuerst et al. | 424/59 |
| 6,000,583 A | 12/1999 | Stern et al. | |
| 6,027,042 A | 2/2000 | Smith | |
| 6,032,830 A | 3/2000 | Brown | |
| 6,039,306 A | 3/2000 | Pericard et al. | |
| 6,062,494 A | 5/2000 | Mills | |
| 6,070,770 A | 6/2000 | Tada et al. | |
| 6,092,698 A | 7/2000 | Bayer | |
| 6,095,435 A | 8/2000 | Greer, Jr. et al. | |
| 6,112,945 A | 9/2000 | Woods | |
| 6,113,070 A | 9/2000 | Holzboog | |
| 6,116,473 A | 9/2000 | Stern et al. | |
| 6,129,247 A | 10/2000 | Thomas et al. | |
| 6,131,777 A | 10/2000 | Warby | |

(56) References Cited

U.S. PATENT DOCUMENTS

| | | | |
|---|---|---|---|
| 6,139,821 A * | 10/2000 | Fuerst et al. | ............ 424/59 |
| 6,152,335 A | 11/2000 | Stern et al. | |
| 6,161,735 A | 12/2000 | Uchiyama et al. | |
| 6,168,093 B1 | 1/2001 | Greer, Jr. et al. | |
| 6,170,717 B1 | 1/2001 | Di Giovanni et al. | |
| D438,111 S | 2/2001 | Woods | |
| D438,786 S | 3/2001 | Ghali | |
| 6,225,393 B1 | 5/2001 | Woods | |
| 6,254,015 B1 | 7/2001 | Abplanalp | |
| 6,257,503 B1 | 7/2001 | Baudin | |
| 6,261,631 B1 | 7/2001 | Lomasney et al. | |
| 6,265,459 B1 | 7/2001 | Mahoney et al. | |
| 6,276,570 B1 | 8/2001 | Stern et al. | |
| 6,283,171 B1 | 9/2001 | Blake | |
| 6,284,077 B1 | 9/2001 | Lucas et al. | |
| 6,290,104 B1 | 9/2001 | Bougamont et al. | |
| 6,291,536 B1 | 9/2001 | Taylor | |
| 6,296,155 B1 | 10/2001 | Smith | |
| 6,296,156 B1 | 10/2001 | Lasserre et al. | |
| 6,299,679 B1 | 10/2001 | Montoya | |
| 6,299,686 B1 | 10/2001 | Mills | |
| 6,315,152 B1 | 11/2001 | Kalisz | |
| 6,325,256 B1 | 12/2001 | Liljeqvist et al. | |
| 6,328,185 B1 | 12/2001 | Stern et al. | |
| 6,328,197 B1 | 12/2001 | Gapihan | |
| 6,333,365 B1 | 12/2001 | Lucas et al. | |
| 6,352,184 B1 | 3/2002 | Stern et al. | |
| 6,362,302 B1 | 3/2002 | Boddie | |
| 6,375,036 B1 | 4/2002 | Woods | |
| 6,382,474 B1 | 5/2002 | Woods et al. | |
| 6,386,402 B1 * | 5/2002 | Woods | ............ 222/394 |
| 6,394,321 B1 | 5/2002 | Bayer | |
| 6,394,364 B1 | 5/2002 | Abplanalp | |
| 6,395,794 B2 | 5/2002 | Lucas et al. | |
| 6,398,082 B2 | 6/2002 | Clark et al. | |
| 6,399,687 B2 | 6/2002 | Woods | |
| 6,414,044 B2 | 7/2002 | Taylor | |
| 6,415,964 B2 | 7/2002 | Woods | |
| 6,439,430 B1 | 8/2002 | Gilroy, Sr. et al. | |
| 6,446,842 B2 | 9/2002 | Stern et al. | |
| D464,395 S | 10/2002 | Huang | |
| 6,474,513 B2 | 11/2002 | Burt | |
| 6,478,198 B2 | 11/2002 | Haroian | |
| 6,478,561 B2 | 11/2002 | Braun et al. | |
| 6,482,392 B1 | 11/2002 | Zhou et al. | |
| 6,510,969 B2 | 1/2003 | Di Giovanni et al. | |
| 6,520,377 B2 | 2/2003 | Yquel | |
| 6,531,528 B1 * | 3/2003 | Kurp | ............ 524/291 |
| 6,536,633 B2 | 3/2003 | Stern et al. | |
| 6,581,807 B1 | 6/2003 | Mekata | |
| 6,588,628 B2 | 7/2003 | Abplanalp et al. | |
| 6,595,393 B1 | 7/2003 | Loghman-Adham et al. | |
| 6,613,186 B2 | 9/2003 | Johnson | |
| 6,615,827 B2 | 9/2003 | Greenwood et al. | |
| 6,637,627 B1 | 10/2003 | Liljeqvist et al. | |
| 6,641,005 B1 | 11/2003 | Stern et al. | |
| 6,641,864 B2 | 11/2003 | Woods | |
| 6,652,704 B2 | 11/2003 | Green | |
| 6,659,312 B1 | 12/2003 | Stern et al. | |
| 6,666,352 B1 | 12/2003 | Woods | |
| 6,894,095 B2 * | 5/2005 | Russo et al. | ............ 524/249 |
| 6,929,154 B2 | 8/2005 | Grey et al. | |
| 7,192,985 B2 * | 3/2007 | Woods | ............ 222/402.1 |
| 7,624,932 B1 * | 12/2009 | Greer et al. | ............ 239/394 |
| 8,038,077 B1 | 10/2011 | Greer, Jr. et al. | |
| 2001/0002676 A1 | 6/2001 | Woods | |
| 2002/0003147 A1 | 1/2002 | Corba | |
| 2002/0100769 A1 | 8/2002 | McKune | |
| 2002/0119256 A1 | 8/2002 | Woods | |
| 2003/0102328 A1 | 6/2003 | Abplanalp et al. | |
| 2003/0134973 A1 | 7/2003 | Chen et al. | |
| 2003/0183651 A1 | 10/2003 | Greer, Jr. | |
| 2003/0205580 A1 | 11/2003 | Yahav | |

FOREIGN PATENT DOCUMENTS

| | | |
|---|---|---|
| CA | 1191493 | 8/1985 |
| CA | 1210371 | 8/1986 |
| CA | 2145129 | 9/1995 |
| CA | 2090185 | 10/1998 |
| CA | 2291599 | 6/2000 |
| CA | 2381994 | 2/2001 |
| CA | 2327903 | 6/2001 |
| CA | 2065534 | 8/2003 |
| CH | 680849 | 11/1992 |
| DE | 210449 | 5/1909 |
| DE | 1926796 | 3/1970 |
| DE | 3808438 | 4/1989 |
| DE | 3806991 | 9/1989 |
| FR | 463476 | 2/1914 |
| FR | 84727 | 9/1965 |
| FR | 1586067 | 2/1970 |
| FR | 2659847 | 9/1991 |
| GB | 867713 | 5/1961 |
| GB | 970766 | 9/1964 |
| GB | 977860 | 12/1964 |
| GB | 1144385 | 3/1969 |
| JP | 461392 | 1/1971 |
| JP | 55142073 | 11/1980 |
| JP | 8332414 | 12/1996 |
| WO | 9418094 | 8/1994 |

OTHER PUBLICATIONS

Newman-Green, Inc., "Aerosol Valves, Sprayheads & Accessories Catalog", Apr. 1, 1992, pp. 14, 20, and 22.
ASTM Designation: G61-86, Standard Test Method for Conducting Cyclic Potentiodynamic Polarization Measurements for Localized Corrosion Susceptibility of Iron-Nickel-, or Cobalt-Based Alloys, (Reapproved 1993), pp. 238-242, Philadelphia, PA.
W. S. Tait, An Introduction to Electrochemical Corrosion Testing for Practicing Engineers and Scientists, 1994, Chapter 6, pp. 63-77, Pair O Docs Publications, Racine, WI.

* cited by examiner

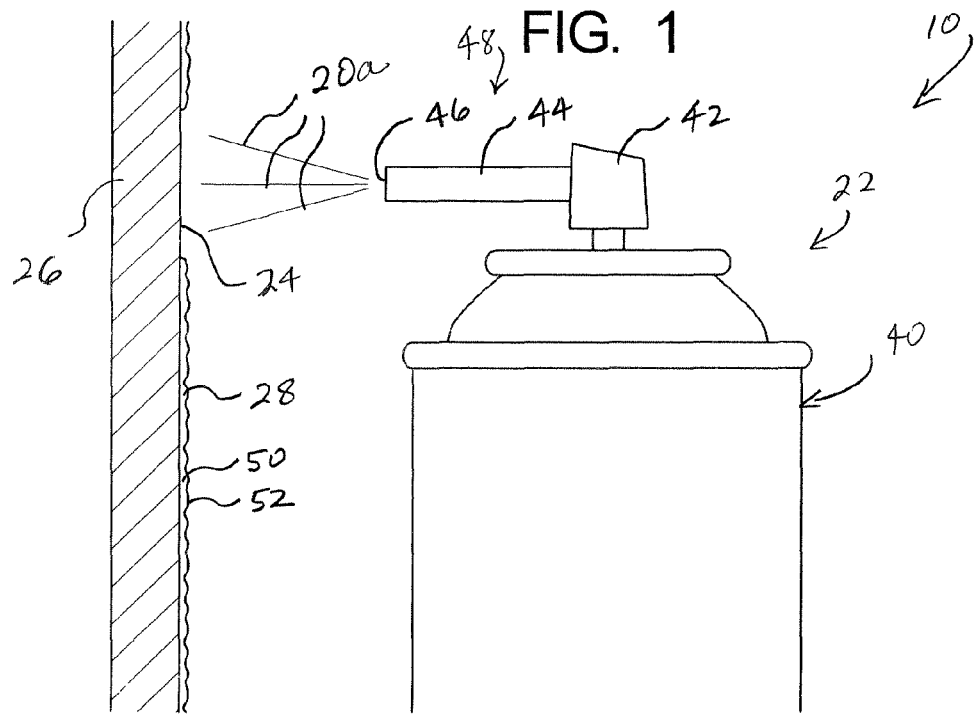
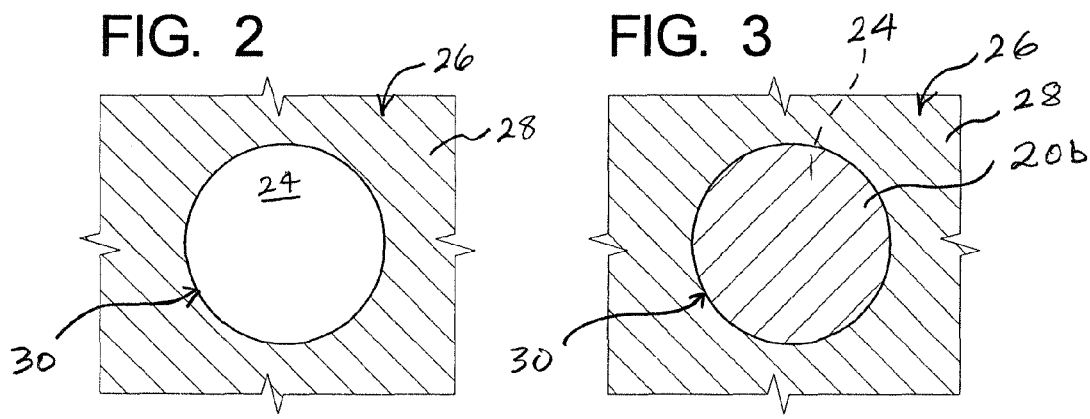
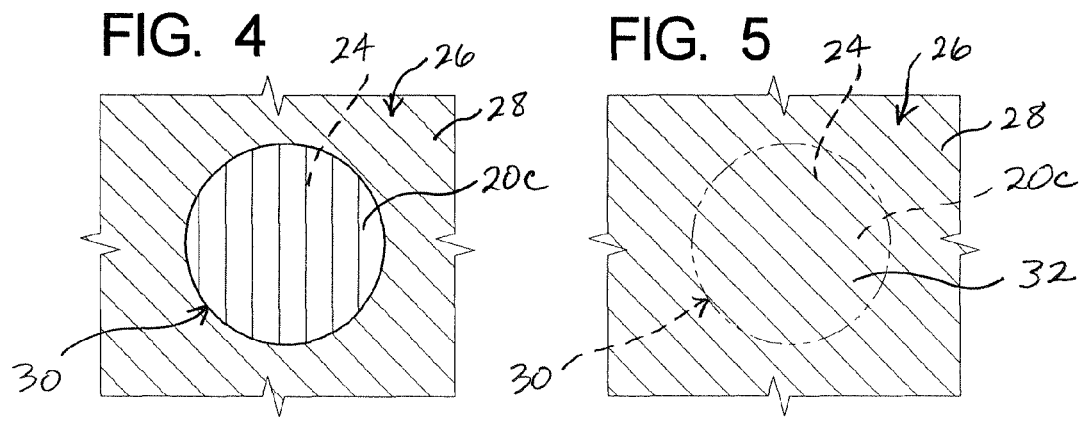

AEROSOL SYSTEM FOR REPAIRING A PATCHED PORTION OF A SURFACE

RELATED APPLICATIONS

This application, U.S. patent application Ser. No. 13/207,384 filed Aug. 10, 2011, is a continuation of U.S. patent application Ser. No. 12/277,229 filed Nov. 24, 2008, now abandoned.

U.S. patent application Ser. No. 12/277,229 is a continuation of U.S. patent application Ser. No. 11/045,412 filed on Jan. 27, 2005, now abandoned.

U.S. patent application Ser. No. 11/045,412 claims priority benefit of U.S. Provisional Application Ser. No. 60/539,681 filed Jan. 28, 2004.

The subject matter of the foregoing related applications are incorporated herein by reference.

TECHNICAL FIELD

The present invention relates to systems and methods for forming a texture on a surface and, more specifically, to texturing systems and methods adapted to apply texture material to cover a repaired portion of a surface having a pre-existing texture formed thereon.

BACKGROUND

Wall and other surfaces are often textured. Textures can be an integral part of the surface, such as with a concrete or wood wall, or can be a separate layer or coating applied to an underlying structural member for aesthetic purposes. The texture can be patterned, as in the case of wood grain, or can be random or variegated, such as with a conventional sprayed on texture coating.

A problem arises when the surface on which a texture pattern has been formed is damaged. The damage may arise from any one of a number of causes such as a dent or hole from an impact, discoloration or the like from water damage, and seams left after the removal and replacement of a portion of structural wall member to allow access through the wall. After the damage has been repaired, the texture on the repaired portion of the wall often does not match the pre-existing texture pattern on the wall around the repaired portion.

One class of surface texture is formed by applying a coating material to the wall surface. Typically, this type of texture material is initially applied to a structural drywall member using a spray applicator that combines the texture material in wet form with a stream of pressurized air. This type of texture material will be referred to herein as drywall texture material. Drywall texture material is typically white and is not usually appropriate as a finish surface, so at least one coat of paint is typically applied over the texture material to form the finish surface.

Aerosol systems for dispensing drywall texture material typically include a system for varying the size of an outlet opening defined by the system to allow the texture pattern formed thereby to be altered to match the pre-existing texture pattern. The present invention is of particular importance when embodied as a system or method for applying drywall texture material during the process of repairing a structural drywall member, and that application of the present invention will be described herein in detail. The present invention may, however, have application to other types of texture materials and application systems. The scope of the present invention should thus be determined by the claims appended hereto and not the present background discussion and following detailed description of the invention.

One problem with repair systems for dispensing drywall texture material is that the coating formed thereby does not set in the desired pattern until the texture material dries. If paint is brushed or rolled onto the texture material before it has dried, the mechanical action of applying the paint over the undried texture material can unacceptably alter the texture pattern. On the other hand, it is desirable to complete the repair job as soon as possible, which requires that paint be applied to the texture material covering the patched region as soon as possible after the texture material has dried.

Additionally, most texture material is white, and white or off-white is a common interior paint color. When a number of small holes in a room are repaired, it can be difficult to determine where the repairs have been made when because the white texture material on the repaired area does not stand out against the background of white paint.

The need thus exists for systems and methods for applying drywall texture material to wall surfaces that: (a) allow paint to be applied over the texture material as soon as possible without altering the texture pattern; and/or (b) help identify where repairs have been made in the wall.

SUMMARY

The present invention may be embodied as a texturing system for applying a desired texture pattern on a patched portion of a surface. The texturing system comprises texture material, a dispensing system for dispensing the texture material, and a selecting system. The texture material comprises a carrier, a binder, a filler, and a change material. The texture material changes from a wet form to a solidified form when exposed to air. The change material changes appearance when the texture material changes from the wet form to the solidified form. The selecting system defines an outlet opening. The selecting system is supported by the dispensing system such that texture material dispensed from the dispensing system is dispensed through the outlet opening in any one of a plurality of spray patterns. The selecting system is configured such the spray pattern corresponds to the desired texture pattern. The dispensing system is arranged such that operating the dispensing system to dispense the texture material causes the texture material to be deposited onto the patched portion of the surface in the desired texture pattern.

BRIEF DESCRIPTION OF THE DRAWINGS

FIG. 1 is a side elevation view depicting an aerosol system for dispensing texture material of the present invention;

FIG. 2 is a front elevation view depicting a patched portion of a textured wall onto which texture material is to be applied;

FIG. 3 is a front elevation view depicting the patched portion of the textured wall of FIG. 2 with texture material of the present invention applied thereto;

FIG. 4 is a front elevation view depicting the patched portion of the textured wall of FIG. 3 after a time interval after which the texture material of the present invention has dried; and FIG. 5 is a front elevation view depicting the patched portion of the textured wall of FIG. 4 after paint has been applied over the dried texture material of the present invention.

DETAILED DESCRIPTION

Referring initially to FIGS. 1, 3, and 4 of the drawing, these figures depict a texturing system 10 for dispensing a texture material 20 formulated in accordance with, and embodying, the principles of the present invention. FIG. 1 shows that the texturing system comprises a dispensing system 22 for applying the texture material 20 to a surface 24 of a structural member 26. FIGS. 1-5 show that a pre-existing surface coating 28 has been applied to the surface 24.

The structural member 26 has been repaired to define a patched portion 30 that is surrounded by an un-patched portion 32. The patched portion 30 is textured with the texture material 20 as shown in FIGS. 3 and 4 and coated with a paint layer 34 as shown in FIG. 5.

The texture material 20 takes several forms in the process depicted in FIGS. 1-5. When stored in and dispensed from the dispensing system 22, the texture material 20 is in a liquid form 20a. When deposited onto the patched portion 30 of the surface 24, the texture material 20 is in a wet form 20b in which the texture material 20 has a physical structure but is malleable. After the texture material 20 dries, the texture material 20 is in a solidified form 20c in which the texture material is no longer malleable.

Importantly, the texture material 20 is formulated such that the appearance of the texture material 20 is different in the wet form 20b than when in the solidified form 20c. As will be described in further detail below, the change in appearance between the wet and solidified forms allows the user to know when the texture material 20 may be painted.

With foregoing general understanding of the present invention in mind, the details of construction and operation of the use of the texture material 20 will now be described in further detail.

The dispensing system 22, structural member 26, pre-existing surface coating 28, and paint layer all are or may be conventional and will be described herein only to the extent necessary for a complete understanding of the present invention.

The exemplary dispensing system 22 is an aerosol dispensing system comprising a container assembly 40, an actuator member 42, and an outlet tube 44 defining an outlet opening 46. The texture material 20 in the liquid form 20a is stored within the container assembly 40 under pressure and in a substantially air-tight manner. The outlet tube 44 is supported by the actuator member 42. Depressing the actuator member 42 causes a valve assembly (not shown) within the container assembly 40 to open, thereby allowing the pressurized liquid texture material 20a to flow out of the container assembly 40 through the outlet opening 46 defined by the outlet tube 44.

Dispensing systems other than the aerosol dispensing system 22 may be used to dispense the texture material 20. As examples, the texture material 20 may be dispensed by using an aerosol system as described in U.S. Pat. Nos. 5,645,198 and 6,152,335, a hand pump dispenser as described in U.S. Pat. No. 4,411,387, or a hopper gun as described in U.S. Pat. No. 5,727,736.

The outlet tube 44 forms a part of a selecting system 48 for selecting the texture pattern created when the liquid texture material 20a is deposited onto the surface 24 of the structural member 26. In particular, a plurality of outlet tubes 44 each defining an outlet opening 46 having a different cross-sectional area may be provided. Each cross-sectional area is associated with a different texture pattern, and the appropriate outlet tube 44 is selected to substantially match the texture pattern of the pre-existing surface coating 28. Selecting systems using straws like the selecting system 48 are described in U.S. Pat. No. 6,116,473. The selecting system may be formed by other selecting systems, such as those disclosed in U.S. Pat. No. 6,446,842. The disclosures of the '473 and '842 patents are incorporated herein by reference.

The structural member 26 is typically a sheet of material referred to as drywall material. Drywall material is relatively inexpensive and has desirable structural and fire-resistant properties, but the surface 24 thereof is not finished. At a minimum, the surface 24 is typically painted or covered with wallpaper. In FIGS. 1-5, this surface 24 was originally sprayed with texture material to form an irregular texture pattern and then painted to obtain the pre-existing surface coating 28.

More specifically, the exemplary pre-existing surface coating 28 comprises a texture layer 50 with a pre-existing texture pattern and a paint layer 52 with a pre-existing color and finish. Accordingly, when the patched portion 30 of the structural member 26 is formed, the surface 24 of the structural member 26 at the patched portion 30 looks and feels different than the pre-existing surface coating 28 on the surface 24 of the structural member 26 surrounding the patched portion 30.

The process of applying the texture material 20 to the surface 24 of the structural member 26 using the exemplary dispensing system 22 will now be described in detail. Initially, as generally described above and shown in FIGS. 1 and 2, the surface 24 of the structural member 26 is exposed within the patched portion 30 after the structural member 26 has been repaired.

The selecting system 48 is initially configured to cause the texture material 20 to be dispensed from the dispensing system 22 in a spray pattern that will result in a desired texture pattern that substantially matches the texture pattern of the pre-existing surface coating 28. The dispensing system 22 is then arranged such that the outlet opening 46 is adjacent to, and the outlet tube 44 is aimed towards, the patched portion 30. The actuator member 42 is then depressed to cause the liquid texture material 20a to be deposited onto the patched portion 30 of the surface 24 of the structural member 26.

When initially deposited onto the surface 24, the texture material is in the form of the wet texture material 20b. The wet texture material 20b contains substantially the same moisture content as the liquid texture material 20a, but the physical structure of the wet texture material 20b corresponds to the desired texture pattern. The wet texture material 20b is malleable, however, and the physical structure thereof can be altered by physical contact.

When deposited onto the surface 24, the material 20 is exposed to ambient air and begins to dry. After a period of time, the wet texture material 20b dries sufficiently to change into the solidified texture material 20c. The solidified texture material 20c is no longer malleable and may be coated with paint using conventional painting techniques without altering the physical structure thereof. Accordingly, as shown in FIG. 5, the paint layer 34 may be applied to the solidified texture material 20c without changing the desired texture pattern associated with the texture material 20 in the wet and solidified forms 20b and 20c.

As generally described above, the texture material 20 is formulated such that the visual appearance of the texture material 20 in the wet form 20b differs from that of the texture material 20 in the solidified form 20c. The change in visual appearance between the wet and solidified forms 20b and 20c may take the form of any one or more of a number of characteristics such as glossiness, color, or the like. The person making the repair is thus able to visually discern when the paint layer 34 may be applied over the patched portion 30.

In general, the liquid form of the texture material 20a comprises a base or carrier, a binder, a filler, and a change material or pigment. If the dispensing system used is an aerosol system, the liquid texture material 20a will further comprise a propellant material. Optionally, the texture material 20 may comprise an aggregate material.

The primary difference between the liquid and wet forms 20a and 20b of the texture material 20 and the solidified form 20c thereof is the moisture content. The moisture content of the texture material 20 is determined by the carrier and optional propellant. The carrier and propellant are liquids that allow the texture material 20 to flow when in the liquid form 20a. The carrier (or base) is typically water which will evaporate over a time period determined by conditions such as heat, humidity, and the like. If used, the propellant typically immediately gasifies as the liquid form 20a of the material 20 is sprayed from the dispensing system 22. Once the liquid ingredients have dissipated, the binder adheres to the surface being coated and holds the filler, pigment, and any other ingredients in the physical structure corresponding to the desired texture pattern.

One characteristic of the texture material 20 is thus that the appearance thereof changes with changing moisture content. The change material or pigment can be any one of a number of materials the appearance of which changes with moisture content. The characteristics of the change material or pigment that change may include sheen and color. As examples, the sheen of the change material or pigment can change from flat to glossy, or vice versa, or the color of the change pigment can change from dark blue to light blue, or vice versa. In any case, this change should be noticeable with the unaided eye.

Desirably, the characteristic of the change material pigment that changes when the texture material 20 is in the solidified form is noticeably distinguishable from the similar characteristic of the pre-existing surface coating 28. For example, if the sheen of the pre-existing surface coating 28 is flat, the texture material 20 could dry to a high gloss finish when in the solidified form. If the color of the pre-existing surface coating 28 is white or off-white, the texture material 20 could dry to a color such as blue or red that can easily be distinguished from that of the surface coating 28.

Suitable change materials or pigments include bromothymol blue (which changes from blue to grey or white), phenolphthalein (which changes from pink to colorless), and thymolphthalein (which changes from blue to colorless or white).

Set forth below is a table containing several examples of formulations of the texture material 20 of the present invention. While the examples of formulations described below are preferred, the present invention may be embodied using other formulations and other change materials or pigments.

Example

| COMPONENT | PRE-FERRED | FIRST PREFERRED RANGE | SECOND PREFERRED RANGE |
| --- | --- | --- | --- |
| water (carrier) | 30% | 25-35% | 20-40% |
| binder | 5.3% | 4.5-5.5% | 3-7% |
| filler | 53.2% | 40-60% | 20-70% |
| propellant | 12.6% | 10-15% | 10-30% |
| bromothymol blue (color change pigment) | 0.005% | 0.003-0.007% | 0.001-0.010% |

In this example, the texture material 20 is adapted to be dispensed from an aerosol dispensing system such as the exemplary dispensing system 22 described above. The texture material 20 of this example when in the liquid and wet forms 20a and 20b is a light blue and fades to a grey or dark green as the moisture content drops sufficiently such that the material 20 is in the solidified form 20c. The user thus knows when the texture material 20 is sufficiently dry to apply a paint coat on top of the solidified texture material 20c. In addition, the user can easily recognize the area (or areas) that needs to be painted because the grey or dark green of the solidified texture material 20c contrasts with typical colors of the pre-existing surface coating 28.

One of ordinary skill in the art will recognize that the present invention may be embodied in forms other than those specifically described above. The scope of the present invention should thus be determined by the following claims and not the foregoing detailed description of the invention.

What is claimed is:

1. An aerosol system for repairing a patched portion of a surface having a surface coating portion having a pre-existing texture pattern and a pre-existing color, where the patched portion of the surface does not have the pre-existing texture pattern:
    texture material comprising substantially between 25% and 35% of a carrier, substantially between 4.5% and 5.5% of a binder, substantially between 40% and 60% of a filler, substantially between 10% and 15% of propellant, and substantially between 0.003% and 0.007% of a change material;
    an aerosol system for dispensing the texture material, where the texture material is mixed with a propellant within the aerosol system;
    a selecting system defining an outlet opening, where the selecting system is supported by the aerosol system such that texture material dispensed from the aerosol system is dispensed through the outlet opening in any one of a plurality of spray patterns, where
        the selecting system is configured such the spray pattern corresponds to the desired texture pattern, and
        the aerosol system is arranged such that operating the aerosol system to dispense the texture material causes the texture material to be deposited onto the patched portion of the surface in the desired texture pattern; whereby
    the change material causes the texture material to change from a first color when the texture material is wet to a second color when the texture material is dry;
    the second color contrasts with the pre-existing color and with the first color.

2. An aerosol system as recited in claim 1, in which the aerosol system comprises an actuator member, in which the selecting system comprises a plurality of tubes, where each tube defines an outlet opening having a different cross-sectional area and one of the tubes is attached to the actuator member to obtain the desired spray pattern.

3. A method of applying a desired texture pattern on a surface having a surface coating portion having a pre-existing texture pattern and a pre-existing color, the method comprising the steps of:
    identifying a patched portion of the surface, where the pre-existing texture pattern is not formed on the patched portion of the surface;
    providing texture material comprising substantially between 25% and 35% of a carrier, substantially between 4.5% and 5.5% of a binder, substantially between 40% and 60% of a filler, substantially between 10% and 15% of propellant, and substantially between 0.003% and 0.007% of a change material;
    providing an aerosol system;

mixing the texture material with a propellant within the aerosol system;

providing a selecting system defining an outlet opening;

supporting the selecting system on the aerosol system such that texture material dispensed from the aerosol system is dispensed through the outlet opening in any one of a plurality of spray patterns;

configuring the selecting system such that the spray pattern corresponds to the desired texture pattern;

arranging the aerosol system such that the outlet opening is adjacent to the patched portion of the surface;

operating the aerosol system to deposit the texture material onto the patched portion of the surface in the desired texture pattern; and allowing the texture material to dry such that the texture material changes from the wet form to the solidified form and the change material changes from a first color to a second color, where the second color contrasts with the pre-existing color and with the first color.

4. A method as recited in claim 3, further comprising the step of applying a coating of paint onto the texture material in the solidified form.

5. A texturing system for preparing a patched portion of a surface for a paint coat, where the surface has a surface coating portion having a pre-existing texture pattern and a pre-existing color, the patched portion of the surface does not have the pre-existing texture pattern, and the paint coat has a paint coat color that substantially matches the pre-existing color:

texture material comprising substantially between 25 and 35 percent by weight, inclusive, of a carrier, substantially between 4.5 and 5.5 percent by weight, inclusive, of a binder, substantially between 40 and 60 percent by weight, inclusive, of a filler, substantially between 10 and 15 percent by weight, inclusive, of a propellant, and substantially between 0.003 and 0.007 percent by weight, inclusive, of a change material;

an aerosol system for dispensing the texture material, where the texture material is mixed with a propellant within the aerosol system; and a selecting system defining an outlet opening, where the selecting system is supported by the aerosol system such that texture material dispensed from the aerosol system is dispensed through the outlet opening in any one of a plurality of spray patterns, where the selecting system is configured such the spray pattern corresponds to the desired texture pattern, and the aerosol system is arranged such that operating the aerosol system to dispense the texture material causes the texture material to be deposited onto the patched portion of the surface in the desired texture pattern; whereby the change material causes the texture material to change from a first color when the texture material is wet to a second color when the texture material is dry;

the second color contrasts with the pre-existing color and with the first color; and the paint coat is formed after the texture material is the second color.

6. A texturing system as recited in claim 5, in which the aerosol system comprises an actuator member, in which the selecting system comprises a plurality of tubes, where each tube defines an outlet opening having a different cross-sectional area and one of the tubes is attached to the actuator member to obtain the desired spray pattern.

7. A texturing system as recited in claim 5, in which the change material is selected from a group of texture materials consisting of bromothymol blue, phenolphthalein, and thymolphthalein.

* * * * *